United States Patent [19]
Greenspan et al.

[11] Patent Number: 5,904,013
[45] Date of Patent: May 18, 1999

[54] OVERLAPPED ALERTING IN WIDE AREA CALL FORWARDING

[75] Inventors: Steven Lloyd Greenspan, Scotch Plains; Robert S. Hisiger, Martinsville; Richard H. Janow, South Orange; Barbara Anne Taylor, Denville, all of N.J.

[73] Assignee: AT&T Corp., Middletown, N.J.

[21] Appl. No.: 08/847,297

[22] Filed: Apr. 24, 1997

[51] Int. Cl.⁶ .................................................. H04M 3/42
[52] U.S. Cl. .............................. 52/211; 379/201; 379/210
[58] Field of Search .................................. 379/211, 210, 379/201, 207, 212

[56] References Cited

U.S. PATENT DOCUMENTS

| | | | |
|---|---|---|---|
| 5,452,349 | 9/1995 | Uehara et al. | 379/93.14 X |
| 5,719,925 | 2/1998 | Peoples | 379/24 |
| 5,729,599 | 3/1998 | Plomondon et al. | 379/188 X |
| 5,815,562 | 10/1998 | Iglehart et al. | 379/158 X |

OTHER PUBLICATIONS

5ESS–2000 Switch, *National ISDN Feature Handbook*, No. 235–390–515, Issue 2.00 (Sep. 1995).

Primary Examiner—Creighton Smith

[57] ABSTRACT

A method for wide area overlapped ringing is disclosed wherein a primary destination is rung, and, if a no answer condition is encountered after an initial ringing threshold, a secondary destination is rung such that the ringing of the primary and secondary destinations at least partly overlap. Some embodiments involve the ringing of more than one secondary destination, where each secondary destination is rung for a set time and then halted. Other embodiments provide bridging capability for three-way calling. The disclosed method has wide area capability; thus, the secondary destination may comprise any destination accessible by the Publicly-Switched Telephone Network.

10 Claims, 4 Drawing Sheets

```
CALL ATTEMPT ONE:  |------------------|
CALL ATTEMPT TWO:           |-----------X
```

```
CALL ATTEMPT ONE:  |------------------X (ANSWERING MACHINE)
CALL ATTEMPT TWO:           |---------|
```

OVERLAPPED ALERTING IN WIDE AREA CALL FORWARDING

BACKGROUND OF THE INVENTION

This invention relates to the field of telecommunications, and more particularly to telephone services for customers using multiple lines.

The use of multiple lines by telephone subscribers is now commonplace. In addition to lines within the household, subscribers frequently rely on cellular lines, lines in office locations, lines at locations near the home, and lines at relatives' or friends' homes. Even more common is the use of multiple lines by businesses.

Whether the multiple lines relate to residential or business use, the individual who generally answers the call can often be found at destinations other than the primary destination (i.e., the destination first dialed by the calling party). Further, the individual's primary destination may be engaged for long periods of time due to extended voice or data connections. For these and other reasons, it is desirable to have a service which can automatically ring other secondary destinations where the answering individual may be present. Such a service might dial other numbers to search for the answering party at one or more secondary destinations. The service would be useful, for example, when the primary reference is busy or when no answer conditions are encountered. The caller could hunt among multiple destinations without having preexisting knowledge of phone numbers at secondary destinations where the subscriber may be present.

Call-forwarding is an example of an application that permits, at the subscriber's initiation, an incoming call to ring to a secondary destination. Standard call-forwarding has several benefits which provide for increased subscriber mobility and flexibility. For instance, many call-forwarding applications are available on a wide area basis. These applications, in particular, enable a subscriber to forward telephone calls to any secondary destination which can be accessed from the central office via the Publicly Switched Telephone Network (PSTN). Such destinations include different twisted pair lines, cellular lines, pagers, and other media. With standard call-forwarding, few limitations on available secondary destinations exist, and no dedicated preprogramming of specific destinations is necessary.

Another feature of some call-forwarding applications permits the subscriber to remotely forward calls from the caller's primary destination to a secondary destination. With this feature, the subscriber can forward incoming calls while located at a remote location; he or she need not be present at the primary destination to initiate the forwarding process. The benefits of this feature are self evident—a subscriber who desires to forward telephone calls typically is not located at the primary destination but rather is at a secondary destination where he or she wishes to receive incoming calls. Hence, a subscriber has the versatility to forward incoming calls regardless of the subscriber's physical location.

A typical call-forwarding method alerts multiple destinations using a single origination. This means that the call-forwarding method is initiated by a single phone call to the primary destination. With this method, a busy or no-answer condition at the primary destination triggers the ringing cycle to commence at a secondary destination. FIG. 1a illustrates a timeline in accordance with this method. Call attempt one is initiated by the user dialing the primary destination. Where a busy signal or a no-answer condition exists at the primary destination, dialing is initiated to a secondary destination (call attempt two). The X in FIG. 1a indicates a successful connection between the caller and a person answering at the secondary destination.

With this method, call attempt one is terminated upon the initiation of call attempt two. Thus, an individual at the primary destination who takes too long to answer will miss the call. This termination of the ringing at the primary destination highlights a common problem associated with standard call-forwarding. Namely, the method requires the users and offerors of such services to predetermine the permissible number of ring cycles associated with the call attempt to the primary destination. This predetermined number, which may reside in the software program executing the call-forwarding algorithm and which may be programmable by the subscriber, dictates the number of times that the primary destination will ring before the connection is terminated in favor of call attempt two. Setting the number too low may result in calls never being answered at the primary destination, thereby eliminating much of the utility of call-forwarding. Typically, in this case, an individual near the phone at the primary destination runs to answer the call but is not fast enough. Moreover, where an answering machine or a call answer service is connected to the primary destination, call-forwarding may defeat the purpose of these utilities by terminating the ringing of the primary destination before the answering machine initiates an automated pickup. Conversely, setting the number of ring cycles too high may lead to an abandoned effort by the calling party before a call is ever initiated to a secondary destination. This situation would likewise defeat much of the utility of call-forwarding.

An alternative prior art method, which allows multiple terminals with a shared directory number to be alerted simultaneously, is shown in FIG. 1b. In such a method, two or more call attempts are concurrently made, and the first answering party is connected to the caller. When this connection occurs in call attempt two, call attempt one is terminated. Schemes like this one are typically used by attendant pools or by call directors that support call centers. When one attendant picks up, all other call attempts are shut down and subsequent pickups do not participate in the call. One characteristic of this arrangement is that it does not give primacy to a single destination. Thus this method is not appropriate for accommodating situations where the subscriber desires most calls to be handled by a primary destination. As an illustration, a subscriber may have a line in his household but may be physically present at a relative's home. With the method of FIG. 1b, a caller dialing the primary destination would automatically initiate ringing at both the subscriber's home and the relative's home. Among other problems, this scheme creates unnecessary ringing cycles at destinations where an answerer is less likely to pick up. The disadvantages of this approach are equally apparent in a business or office setting.

Other methods have been proposed in the literature which provide for delayed ringing on one telephone number which appears on two stations. (National ISDN Feature Handbook, 5ESS-2000 SWITCH, Issue 2.00 2.1-95 (Sep. 1995)). These applications, however, are limited to a predefined group of dedicated terminals and have no remote or wide area capability. Certain centrex applications, for instance, employ a preprogrammed extension dialing feature for an office building, and provide for call-forwarding capability between extensions in the building. However, these methods lack the versatility of standard call forwarding systems which are generally more global and which are not restricted to a preprogrammed set of destinations. Unfortunately, current call-forwarding algorithms possess other shortcomings, discussed above, which greatly limit their overall utility.

It is therefore an object of the invention to disclose a method for hunting among two or more destinations in a system having multiple telephone lines, which method possesses wide area capability and which overcomes disadvantages associated with existing methods.

Another object of the invention to disclose an improved method for hunting among a plurality of destinations in a telephone system wherein multipoint connections are employed for the benefit of a subscriber.

Further objects will be apparent to those skilled in the art upon perusal of this disclosure, claims, and drawings.

SUMMARY OF THE INVENTION

This invention provides a solution to the shortcomings of current hunting schemes and call forwarding capabilities of central office and PBX switches. The invention is based upon overlapped ringing for a controlled duration during which multiple destinations are simultaneously alerted. A caller initiates a call to a primary destination. After a predetermined number of ring cycles have passed under a no-answer condition, the method initiates ringing to a secondary destination. Thereafter, the ringing cycles of both the primary destination and the secondary destinations are concurrent.

In one embodiment, the hunt sequence involves a plurality of secondary destinations, and the primary destination in the sequence remains in the ringing state while subsequent destinations are rung for a set time and then terminated. Another embodiment permits bridging if more than one destination number is answered within a predetermined duration of one another. Still another embodiment combines overlapped ringing with overlapped signaling involving modems or other data-oriented devices at the destination numbers.

Unlike existing delayed ringing applications, this method possesses full wide area capability and as such, need not be restricted to a predefined group of user destinations. The method further provides for both remote assignments of secondary destinations and for wide selection among any secondary destination accessible by the PSTN, including without limitation remote and cellular lines.

Further features of the invention, its nature and various advantages, will be more apparent from the accompanying drawings and the following detailed description of the preferred embodiments.

BRIEF DESCRIPTION OF THE DRAWINGS

FIG. 1, is a set of conceptual timelines of prior calling methods.

FIG. 2, is a set of conceptual timelines of one embodiment of an overlapped ringing method in accordance with the present invention.

FIG. 3, is a set of conceptual timelines of another embodiment of an overlapped ringing method in accordance with the present invention.

FIG. 4, is a flowchart of an overlapped ringing method in accordance with a preferred embodiment of the present invention.

DETAILED DESCRIPTION OF THE INVENTION

Figure 1A:
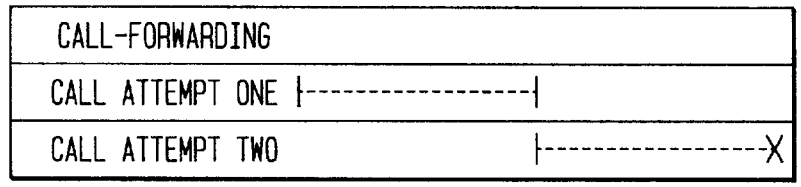
FIGS. 1a and 1b, collectively
Figure 1B:
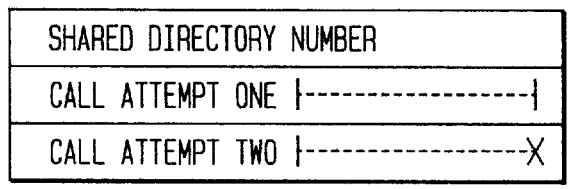
Figure 2A:
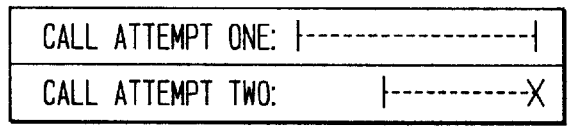
FIGS. 2a and 2b, collectively
Figure 2B:
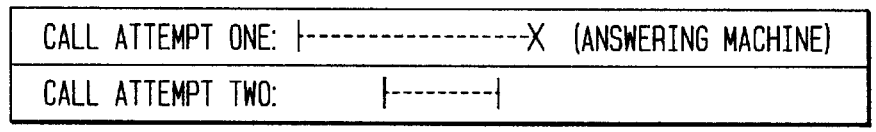

FIG. 2 shows exemplary timelines of a method in accordance with the present invention. The method provides overlapped ringing for a controlled duration during which multiple destinations are simultaneously alerted. A subscriber is associated with a primary destination, which is typically (although not necessarily) a home or business phone on the wired network. When the need arises, the subscriber can select a secondary destination (e.g., a cellular line, another line on the wired network, etc.) at which location he may be present in lieu of the primary. The subscriber may, for example, desire to have calls terminate at the primary destination except in a no answer condition, at which point ring cycles to the secondary destination would be initiated. Thus, in FIG. 2a, a caller initiates ringing to the subscriber's primary destination (call attempt one), then after several cycles the secondary destination is alerted (call attempt two). In another case, the subscriber may wish to have an answering machine pick up the call at the primary destination. This is shown in FIG. 2b. Specifically, a caller initiates ringing to a primary destination (call attempt one), and after a number of ring cycles a secondary destination is alerted (call attempt two). In due course, the answering machine picks up the call at the primary destination at which point the connection to the secondary destination is terminated.

In a case where the hunt sequence instead involves more than two lines, the first destination in the sequence preferably remains in the ringing state, while subsequent destinations are rung for a set time and then halted.

Figure 3A:
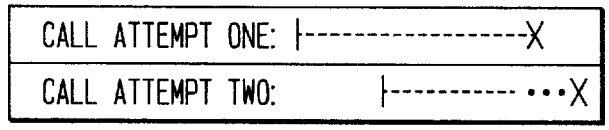
FIGS. 3a and 3b, collectively
Figure 3B:
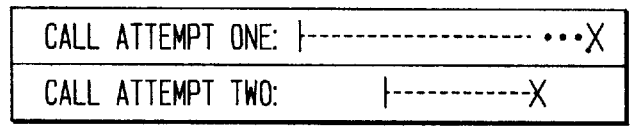

Referring to FIG. 3, which shows a timeline of another embodiment in accordance with the invention, a bridging procedure is implemented wherein more than one destination number is answered within some parameterized duration of one another. In FIG. 3a, ringing is initiated at the primary destination (call attempt one) as in the normal course. After a few ring cycles, the secondary destination is rung (call attempt two). It is assumed that an individual picks up at the primary destination. Here, even though the call has been answered, the secondary destination continues to ring. Thus the " . . . " in FIG. 3 symbolizes ring cycles with a distinctive ring, indicating that the call was answered at another line (in FIG. 3a, the primary destination) but still may be answered from the secondary destination as well. FIG. 3b illustrates the reverse of this process, where the call is first answered at the secondary destination but continues to ring at the primary destination with a distinctive ring. This feature would allow distinct lines in the group to behave like extension phones on a single line. After a set time has elapsed, the rung/unanswered lines are no longer available for bridging, thereby freeing the lines for other calls. The ring signal used to signify bridging availability is preferably one that does not trigger answering machines.

Advantageously, these features may be combined with distinctive personal ringing patterns and customer options such as individualized hunting/ringing sequences. As an illustration of the latter, each person in a household is associated with a primary destination where others seeking that person can call. Distinctive ring patterns can also be used to differentiate between individuals. Also, at the individual's option, a search order (beginning with his or her primary destination) can be established whereby ringing is first commenced at a predetermined location where the individual is most likely to be found.

These algorithms can be implemented in a telecommunications network using methods similar to standard call forwarding. In particular, the algorithm can be programmed into any commercially available switch which is capable of manipulating independent legs of a telephone call. In this case, the program implementing the algorithm would reside on the subscriber's switch at the local exchange. A dedicated register is uniquely associated with the local switch and the subscriber's primary line. This register is used when the subscriber wishes to forward his calls to another destination as in typical call-forwarding applications. Advantageously, this type of switch-programming provides wide area capability; that is, a subscriber is not limited to forwarding his or her calls only to dedicated terminals but may instead forward the calls to any destination accessible by the PSTN.

Alternatively, the algorithm may be implemented by programming an adjunct, which is typically connected to the subscriber's switch via a BRI for coordinating switching. One example of a commercially utilized adjunct is AINet. In the call-forwarding scenario, the adjunct essentially functions by redirecting calls from an originating switch to a forwarded destination.

FIG. 4 shows a flowchart of a preferred algorithm for overlapped ringing in accordance with the present invention. The following definitions apply to the preferred embodiment illustrated by the flowchart:

1) primary line—The line associated with the telephone number dialed by the caller and owned or used by the subscriber.

2) secondary line—The line associated with the telephone number to which the subscriber desires to have calls forwarded. Typically, this intention is established by the subscriber entering this telephone number into a call-forwarding register on the local switch or adjunct. The call forwarding register would be uniquely associated with the primary line.

3) initial ringing threshold—the time period during which the primary line, and only the primary line, rings. When exceeded, a call setup to the secondary line is attempted.

4) terminating ringing threshold—the time period, or alternatively, the number of ring cycles, after which a primary line or secondary line terminates ringing (assuming no answer).

5) wide area line—a wide area line is any secondary line which is accessible by the PSTN. In other words, a wide area line is not limited to a preprogrammed or prededicated line such as extension lines within an office building.

6) contingency—a condition where ringing has commenced on the primary line but the line has not been answered after an initial ringing threshold has been exceeded.

Figure 4A:
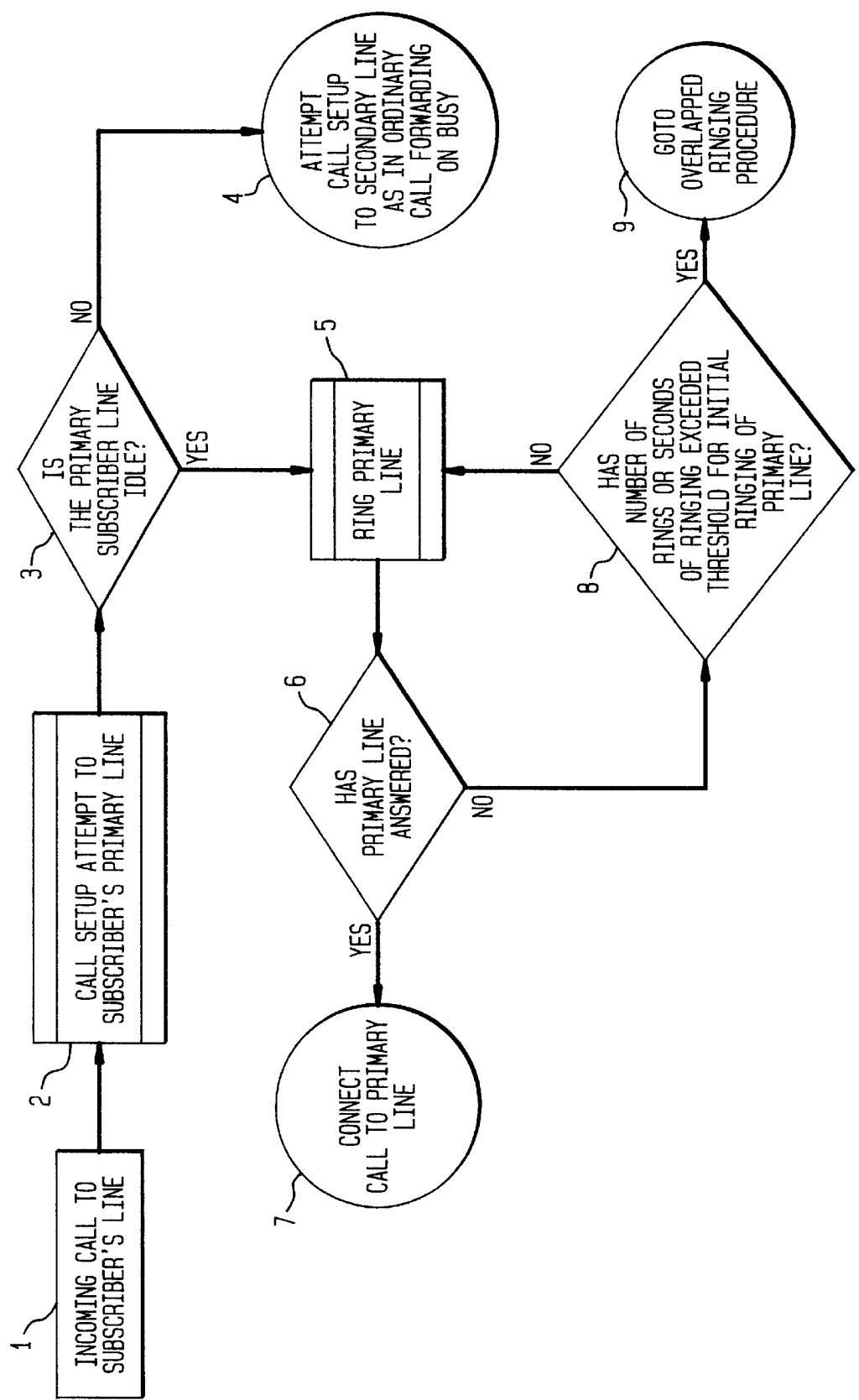
FIGS. 4a, 4b and 4c, collectively

7) connecting a line—establishing a connection between a caller and an answering party A caller makes an incoming call to the subscriber's line, illustrated by step 1 in FIG. 4*a*. Thereupon, via the telephone network and the appropriate switch associated with the subscriber's line, a call setup is attempted to the subscriber as in step 2. At this point, the call setup method determines whether the subscriber's primary line is idle (step 3). If the line is not idle, such as the case where a busy signal is encountered, a call setup is attempted to a secondary line (step 4). This step resembles that of ordinary call forwarding.

Alternatively, if the subscriber's primary line is idle, then ringing is initiated on that line as shown in step 5. The ring cycles will thereupon commence and will continue until a person answers (step 6). If the call is not answered, the ringing will continue for a parameterized number of ring cycles or a predetermined time called an initial ringing threshold (steps 5, 6, 8). Where a person answers, the call is simply connected to the primary line as in step 7, and the process is complete. Where, on the other hand, the number of ring cycles (or, if a predetermined time is set instead, the number of seconds) has exceeded the initial ringing threshold, the overlapped ringing procedure is commenced (FIG. 4*a* step 9, FIG. 4*b* step 10).

Figure 4B:
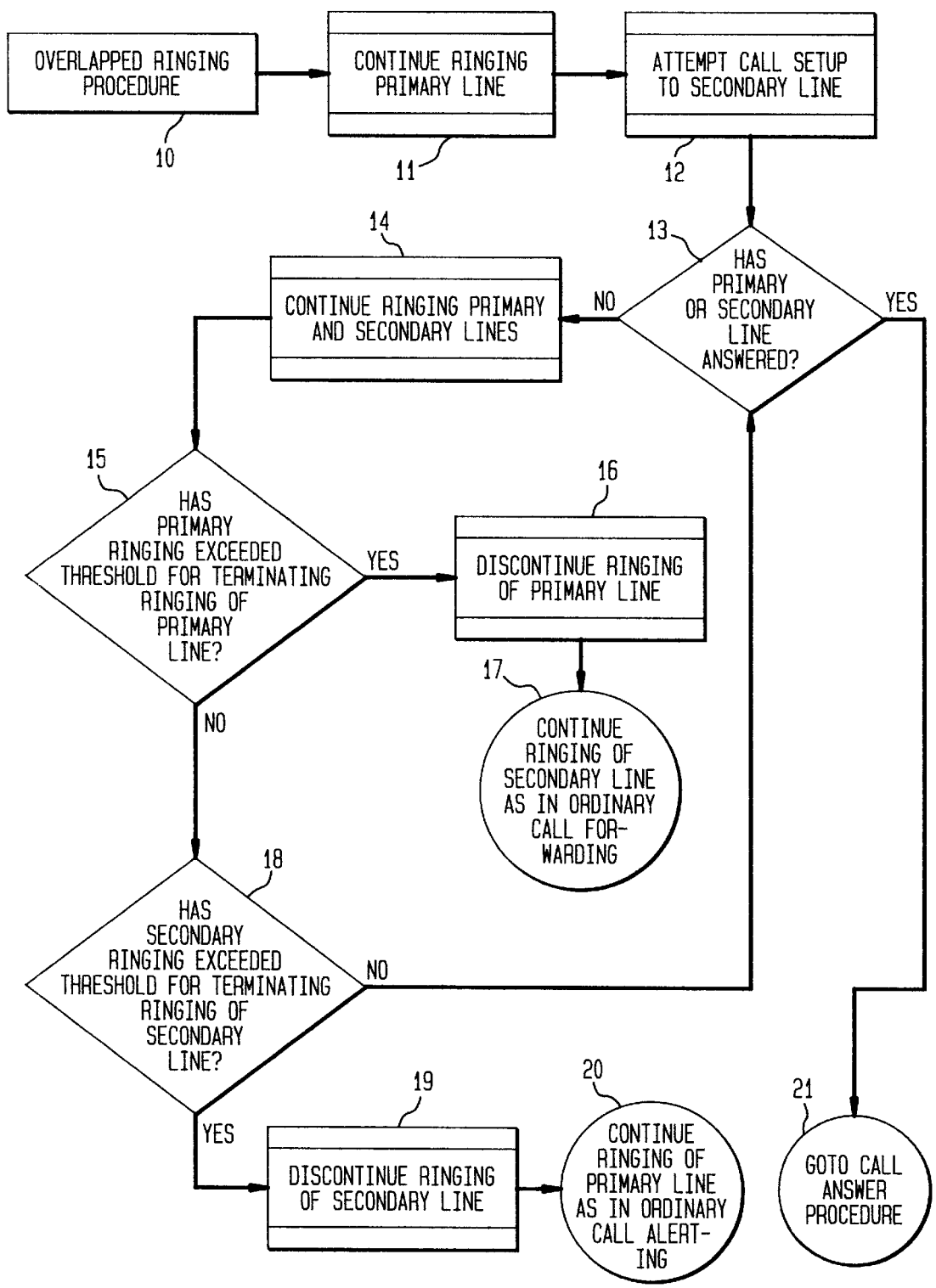
Figure 4C:
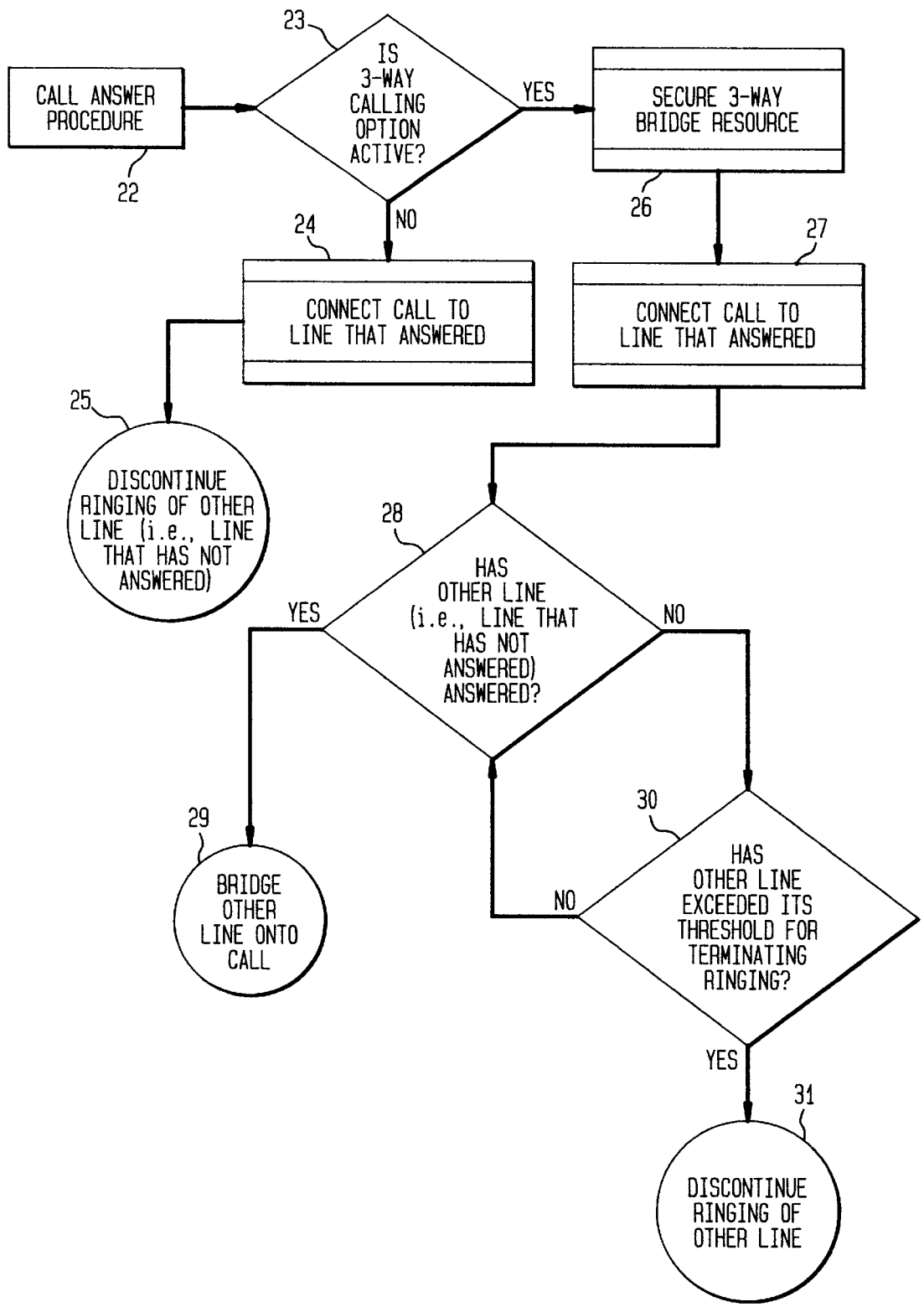

In FIG. 4*b*, the overlapped ringing procedure continues to ring the primary line (step 11), but also attempts a call setup and initiates ringing to the secondary line (step 12). The secondary line is a wide area line. The procedure continues to ring the primary and secondary lines where no answer conditions are encountered (steps 13, 14). The ringing on the primary and secondary lines are at least partially concurrent; that is, there is at least some overlap in time of the ringing cycles. If either line answers, then the call answer procedure of FIG. 4*c* is initiated (discussed below). Meanwhile, the procedure intermittently determines whether the primary ring cycles have exceeded the predetermined threshold for terminating the ringing on the primary line (step 15). If so, the ringing of the primary line is discontinued (step 16), and the secondary line continues to ring as in ordinary call forwarding (step 17). If the primary ringing threshold has not been exceeded, the procedure will further determine whether the secondary ring cycles have exceeded the threshold for terminating ringing on the secondary line (step 18). If so, ringing is discontinued on the secondary line (step 19). In this event, however, ringing on the primary line is continued as in a regular telephone call (step 20).

FIG. 4*c* illustrates a preferred call answer procedure in accordance with the invention. A bridging capability is shown here. In step 23, the procedure determines whether the subscriber has activated a 3-way calling option. If not, the call is simply connected to the line that answered (step 24). In this event, ringing at the non-answered line is terminated (step 25). If, however, the subscriber's 3-way calling option is active, then a 3-way bridge resource is secured (step 26) and the call is connected to the line that answered (step 27). The method also determines whether the other line has yet been answered (step 28). If so, that line is bridged onto the call (step 29). If the other line has not yet been answered and the ringing threshold of that line has been exceeded, then ringing on that line is discontinued.

It will be understood that the foregoing is merely illustrative of the principles of the invention, and that various modifications and variations can be made by those skilled in the art without departing from the scope and spirit of the invention. The claims appended hereto are intended to encompass all such modifications and variations.

The invention claimed is:

1. A method for overlapped alerting in wide area call-forwarding applications for telecommunications systems, comprising the steps of:

receiving a call setup attempt on a subscriber's primary line;

initiating ringing on the primary line;

attempting, upon encountering a contingency on the primary line, a call setup on a secondary line designated by the subscriber;

initiating ringing on the secondary line, the ringing on the secondary and primary lines being at least partially concurrent;

terminating ringing on the primary line if a terminating ringing threshold has been exceeded, and connecting the primary line if the primary line is answered; and connecting the secondary line and terminating ringing on the primary line if the secondary line is answered at a time when the primary line has not yet been answered.

2. The method according to claim 1, wherein the secondary line is a wide area line.

3. The method according to claim 2, wherein the wide area line is a cellular line.

4. The method according to claim 1, further comprising the step of:

terminating ringing on the secondary line if the primary line is answered.

5. A wide-area overlapped ringing method for a telephone system, comprising the steps of:

receiving a call setup attempt on a subscriber's primary line;

initiating ringing on the primary line, and connecting the primary line if the primary line is answered;

attempting, if the initial ringing threshold on the primary line has been exceeded, a call setup attempt on a first secondary line;

initiating ringing on the first secondary line, the ringing on the primary line being at least partially concurrent with the ringing on the secondary line;

terminating ringing on the first secondary line if a terminating ringing threshold has been exceeded, and connecting the first secondary line if the first secondary line is answered;

attempting, if the terminating ringing threshold has been exceeded and if the first secondary line has not been answered, a call setup on a second secondary line;

initiating ringing on the second secondary line; and terminating ringing on the second secondary line if the secondary ringing threshold has been exceeded, and connecting the second secondary line if the second secondary line is answered.

6. A method for wide-area overlapped alerting in telecommunications systems, comprising the steps of receiving a call setup attempt on a primary line;

initiating ringing on the primary line;

attempting, if the primary line is not answered within an initial ringing threshold, a call setup on a plurality of secondary lines, the plurality of secondary lines being designated by the subscriber;

initiating ringing on the plurality of secondary lines, the ringing of the primary line and at least one of the plurality of secondary lines being at least partially concurrent;

terminating ringing on the primary line if a first terminating threshold has been exceeded, and connecting the primary line if the primary line is answered;

terminating ringing on each of the plurality of secondary lines if, with respect to each secondary line, a second terminating threshold has been exceeded, and connecting one of the plurality of secondary lines and terminating the remainder of the plurality secondary lines if the one of the plurality of secondary lines is answered.

7. The method according to claim 6, wherein said ringing is initiated and terminated on each of the plurality of secondary lines one at a time.

8. A method for wide area overlapped alerting and bridging in a telecommunications system, comprising the steps of:

receiving a call setup attempt on a primary line;

initiating ringing on the primary line;

attempting, if the primary line is not answered within an initial ringing threshold, a call setup on a secondary line;

initiating ringing on the secondary line, the ringing on the primary and secondary lines being at least partially concurrent; and bridging the primary line and secondary line if the primary and secondary lines are answered within a parameterized duration of one another.

9. The method according to claim 8, further comprising the step of:

transmitting a distinctive ringing sound on the primary line if the secondary line is answered and the primary line has not yet been answered.

10. The method according to claim 9, further comprising the step of:

transmitting a distinctive ringing sound on the secondary line if the primary line is answered and the secondary line has not yet been answered.

* * * * *